United States Patent [19]

Swope

[11] Patent Number: 4,808,899
[45] Date of Patent: Feb. 28, 1989

[54] METHOD AND APPARATUS FOR AUTOMATIC SERVO GAIN ADJUSTMENT FOR MACHINE CONTROL

[75] Inventor: David C. Swope, North Bend, Ohio

[73] Assignee: Cincinnati Milacron Inc., Cincinnati, Ohio

[21] Appl. No.: 20,820

[22] Filed: Mar. 2, 1987

[51] Int. Cl.$^4$ .................. G05B 5/01; G05B 13/02
[52] U.S. Cl. .................. 318/619; 318/625; 318/632
[58] Field of Search .......... 318/561, 632, 619, 66, 318/68, 85, 112, 615, 616, 619, 625

[56] References Cited

U.S. PATENT DOCUMENTS

| | | | |
|---|---|---|---|
| 4,374,349 | 2/1983 | Inaba et al. | 318/561 X |
| 4,423,365 | 12/1983 | Turner | 318/561 |
| 4,498,036 | 2/1985 | Salemka | 318/561 |
| 4,588,937 | 5/1986 | Fujioka et al. | 318/561 X |
| 4,628,971 | 11/1986 | Ailman et al. | 318/561 X |
| 4,629,955 | 12/1986 | French et al. | 318/625 |
| 4,638,230 | 1/1987 | Lee | 318/616 X |
| 4,697,127 | 9/1987 | Stich et al. | 318/561 |
| 4,714,400 | 12/1987 | Barnett et al. | 318/625 X |

Primary Examiner—Bentsu Ro
Attorney, Agent, or Firm—Wood, Herron & Evans

[57] ABSTRACT

An apparatus and method is disclosed for controlling a motor of a machine to move a member at a predetermined velocity. Specifically, a gain factor included in generating a velocity command signal to the motor is dynamically adjustable in accordance with a relationship between the actual following error of the member and the desired following error at the commanded velocity to thereby compensate for drifts in the drive system electronics. The gain factor for a plurality of members may be similarly dynamically adjusted whereby the path of an application point coupled to all the members is accurately controlled. The invention is also suitable for controlling movement of distal ends of a gantry to eliminate or reduce skewing of the gantry member.

8 Claims, 6 Drawing Sheets

METHOD AND APPARATUS FOR AUTOMATIC SERVO GAIN ADJUSTMENT FOR MACHINE CONTROL

BACKGROUND OF THE INVENTION

I. Field of the Invention

This invention relates to dynamic gain adjustment of a servo control by which velocity of a member driven by a motor may be maintained in order to provide path accuracy thereto, and in particular to velocity control of separate drive motors located at distal ends of a rigid member, such as a horizontal gantry.

II. Description of the Prior Art

By way of background, one example of a machine which may advantageously use the dynamic gain adjustment feature of the present invention is a computerized tape-laying machine. Such a machine includes a horizontal gantry mounted for linear movement above the ground on a machine frame including left and right sidewalls fixedly supported on respective left and right pylons. Mounted for linear movement perpendicularly relative to the gantry is a carriage which movably supports a tape applicator head. The tape head is vertically and rotationally movable such that in cooperation with the gantry and carriage, a tape dispensing point of the tape head is movable in a plurality of rectilinear and/or rotational axes under control of a computer program by which to apply several plies of composite material or tape to a layup placed on a mold between the pylons to form aircraft parts, for example.

Movement of each member (gantry, carriage, etc.) is effected by one or more motors under control of respective servo controls. As is well known, commands from a computer control or the like to a servo control will cause the servo control to generate appropriate voltage signals to effectuate rotation of the related motor by which the member is propelled. That is, in response to appropriate commands from the computer, the selected members will thus be driven along the desired linear or rotational axis a desired distance or angle in a desired direction. By moving the members as desired, the tape applicator head will follow a desired path and cause various patterns of built-up composite layers to be placed upon the layup.

Movement of a member is effected by a motor coupled to a servo control. The computer calculates the distance the member is to be moved and, based upon predetermined feed rates, determines how far the member should move in a predetermined time or interpolation interval. The computer will utilize that information to repeatedly generate change in position commands by which to simultaneously instruct the servo control to cause the motor to move the member a particular distance during that particular interpolation or iteration interval. Thus, for example, instructing the member to move 0.01 inch every 10 ms ideally results in effecting movement of the member at a velocity of 1.0 inch/sec. The servo control will then generate a voltage signal corresponding to the desired velocity of the member, which velocity is itself correlated to the desired position commands from the computer.

More particularly, a resolver coupled to each drive motor generates a resolver signal which is utilized to indicate to the associated servo control the position of the member. Coupled between each motor and related servo control is a drive amplifier to supply motor drive currents in response to the velocity signal from the associated servo control. The motor may also provide a tachometer signal for use by the drive amplifier in a velocity feedback loop as is conventional. The servo controls will each generate a velocity command signal based upon an error signal which is derived from the actual position of the member (as indicated by the resolver signal) and the desired position thereof (as indicated by the change in position command signal from the computer). Typically, the error signal is the difference between the actual and change in position signals. The servo control will typically multiply the error signal by a constant, pre-determined gain factor signal to generate the velocity command signal. The velocity command signals are then converted in the servo control to voltage signals and coupled through an associated drive amplifier to a respective motor to cause movement of the member at a velocity correlated to the error and gain factor signals. The gain factor signal is selected so that the voltage signal corresponding to the velocity command signal will result in movement of the gantry at a predetermined velocity correlated to a predetermined error signal, e.g., 1 inch/min for one-thousandth inch error signal ( 1 inch/min per 1/1000 FE). The gain factor signal facilitates for correction of known offsets and/or relationships in the gear mechanisms, for example.

During normal operation, certain circuit components of the servo control equipment may drift, such as from temperature variations. This is especially a problem with the drive amplifiers. In some situations, such as where the tape head is to be moved over a substantial distance, drift in the drive amplifiers may cause one or more of the various members to follow paths different from the desired paths, whereby the tape head also does not follow the desired path. For example, while the computer is repeatedly instructing a servo control to cause movement of a member a specified distance, a drive amplifier is being provided voltage signals correlated to the change in position command to cause the motor to move the member at a predetermined velocity for a specified period of time. However, due to the effects of drive amplifier drift the motor may be driven by currents which vary such that the true velocity of movement of the member may be more or less than that needed to move the requisite distance to the commanded position during the predetermined interval. As a result, during any given time interval, the member may move at a velocity other than that which is desired, leading to a path error. Such an error may cause the tape pattern to vary from the desired pattern. For example, if the tape is to be cut while the tape applicator head is moving, path error may cause an incorrect length of tape to be cut.

Drift in the drive amplifiers can have further adverse consequences with particular respect to the gantry. Movement thereof is effected by a pair of motors each coupled to a respective servo control and coupled to distal ends of the gantry adjacent each supporting sidewall of the machine frame. The computer generated change in position commands are provided to each motor to move the respective distal end at the same velocity. This type of dual servo control utilized for controlling a pair of drive motors disposed at opposite ends of the gantry is referred to as a split axis control. As is well understood, each end of the gantry must move at the same velocity in order to assure that the gantry will move in a straight line. Should one end of the gantry not move at the correct velocity, the gantry will skew. Drift in the drive amplifiers associated with the ends of the gantry may not be equal in magnitude, causing one end of the gantry to be driven at a velocity not precisely matched to that of the other end. As a result of such drift, the gantry will not move uniformly and may skew. Moreover, since the ends of the gantry are often driven at velocities as high as 1800 inch/min., even minor and temporary unequal drift between the drive amplifiers could result in substantial skewing, damaging the machine.

Heretofore, excessive skew has been accommodated by slowing or stopping the gantry. Additionally, where two servo mechanisms are to be driven by the same change in position command from a computer, skew has been reduced or avoided by compensating the gain of one of the servo mechanisms in response to a difference in the actual position of both ends of the gantry as the gantry is moving. An apparatus employing such gain compensation is disclosed in U.S. Pat. No. 4,629,955, issued Dec. 16, 1986, the disclosure of which is incorporated herein by reference. While such gain compensation can reduce skew and provide path accuracy to a member which is under split axis control by the same change in position command, such an approach may not be appropriate to control members not under control of the same change in position command. Thus, in a tape laying machine, for example, where the tape applicator head is to move in a plurality of axes under control of several change in position commands (e.g., one for each axis), the gain compensation of the aforesaid patent is not applicable to ensure the overall path accuracy of the tape applicator head.

SUMMARY OF THE INVENTION

The present invention provides a method and apparatus for controlling a motor so that the actual velocity at which a member is driven by the motor is the desired velocity notwithstanding drift or other variations in the electronics as discussed above. When the velocity is so maintained, the member is thus kept to the desired path as it moves. In its broadest sense, the invention provides such a method and apparatus by dynamically adjusting the gain factor in accordance with a relationship between the error signal and the change in position command signal so that variations in the electronics which retard or advance actual movement of the member are effected by a corresponding modification to the gain factor while the member is in motion. Each member or axis may be likewise controlled whereby path accuracy of a tape head, for example, is enhanced.

The invention is also advantageously applicable to a split axis control. By dynamically adjusting the gain factor of each servo control independently of the other, even in relationship to a common change in position command signal, the ability to maintain each end of a gantry or the like operating at desired and substantially identical velocities is enhanced, thus maintaining path accuracy and minimizing the likelihood of gantry skew.

These and other objects and advantages of the present invention shall be made apparent from the accompanying drawings and the description thereof.

BRIEF DESCRIPTION OF THE DRAWINGS

The accompanying drawings, which are incorporated and constitute a part of this specification, illustrate a preferred embodiment of the invention and, together with a general description of the invention given above, and the detailed description of the preferred embodiment given below, serve to explain the principles of the invention.

DESCRIPTION OF THE PREFERRED EMBODIMENT

To illustrate the present invention, a program controlled tape-laying machine incorporating a gantry structure together with the control therefor shall be described in detail. The machine 10 to be described herein is preferably a "CTL Multi-Axis CNC Fiber Placement Machine" and is available from Cincinnati Milacron, Inc., the assignee of the present invention and described in a brochure of the same title, Publication No. SP-152-2, Copyright 1986. Publication No. SP-152-2 is incorporated herein by reference. Control 100 to be described herein is preferably an ACRAMATIC 975 CNC also available from Cincinnati Milacron as described in "Feature Descriptions for the Cincinnati Milacron Acramatic 975C", Publication No. CTL-452, revised Jan. 28, 1986. Publication No. CTL-452 is incorporated herein by reference. It is to be understood that the applicability of the present invention is not limited to tape-laying machines but is also suitable for use with any program controlled machine incorporating a motor under control of a servo control, including split axis control movement of a gantry structure.

Figure 1:
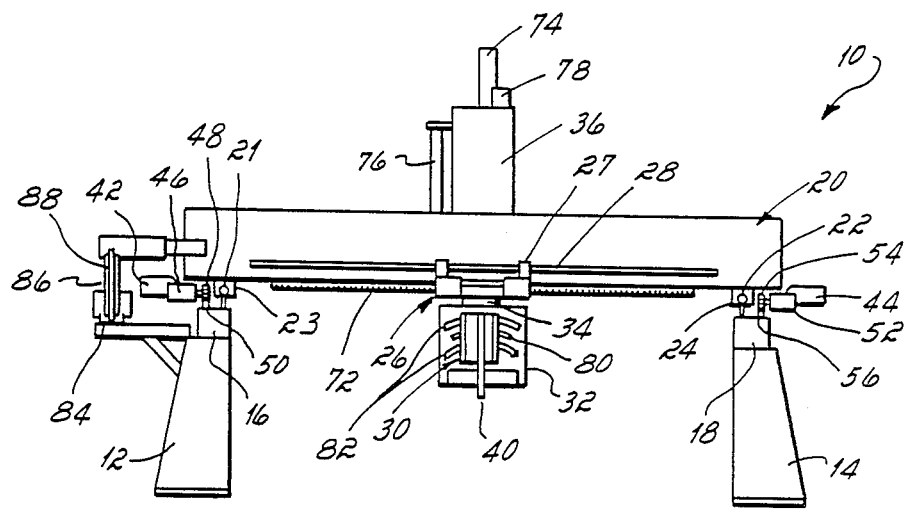
FIG. 1 is an end view of a tape-laying machine including a gantry structure.
Figure 2:
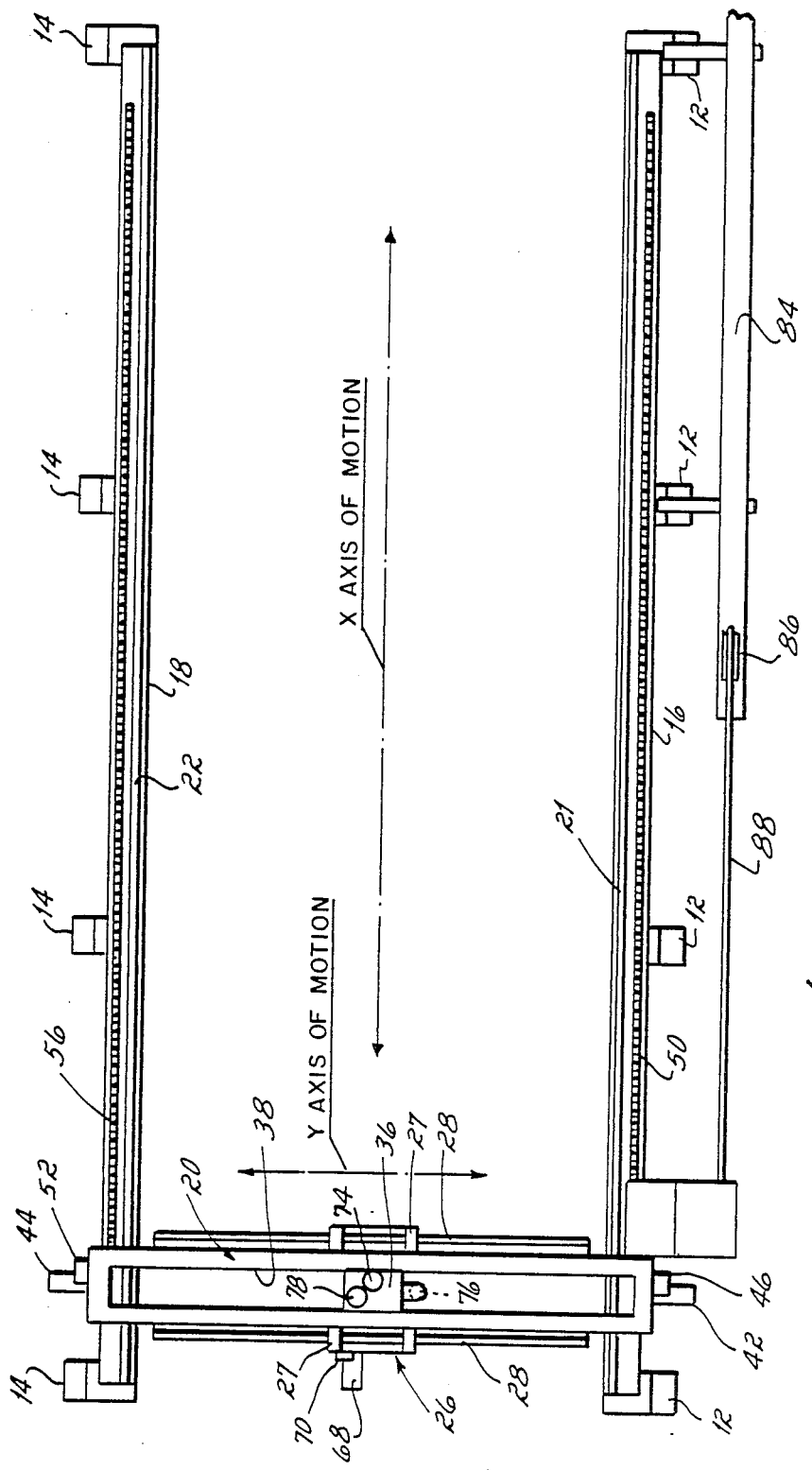
FIG. 2 is a top view of the machine of FIG. 1 showing the motion axis of the gantry structure.

The machine shall be described with reference to FIGS. 1 and 2. Machine 10 includes a plurality of vertical support stands or pylons 12,14 which fixedly support horizontal side members 16,18 respectively, to define a machine frame. Fixedly secured to side members 16,18 are cylindrical ways 21,22, respectively. A horizontal gantry or member 20 is supported on side members 16,18 by slides 23,24 slidably supported on cylindrical ways 21,22, respectively. Gantry 20 comprises a large rectangular cross-section member to which slides 23,24 are rigidly affixed. Horizontal motion of gantry 20 relative to vertical support stands 12,14 defines the X axis of motion of machine 10.

A carriage 26 is movably supported upon gantry 20. To this end, carriage 26 carries slides 27 which are slidably supported upon cylindrical ways 28. Ways 28 are fixedly attached to gantry 20. Horizontal motion of carriage 26 relative to gantry frame 20 along ways 28 is defined as the Y axis of motion.

Figure 3:
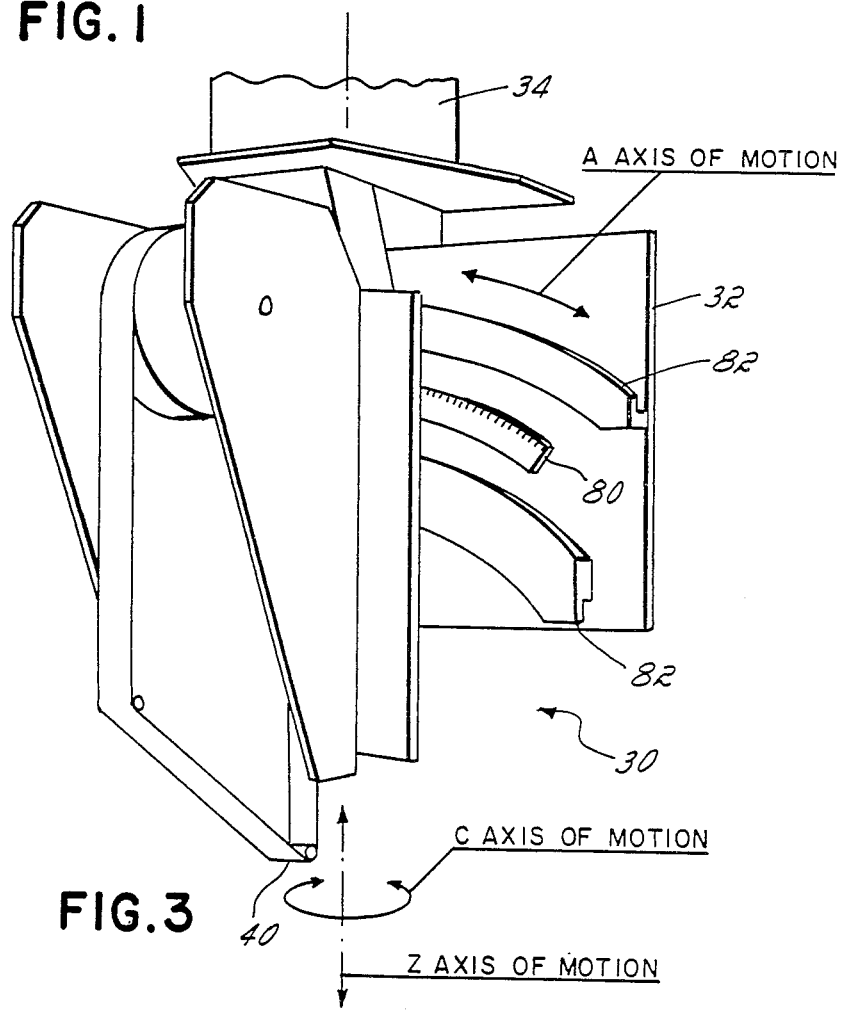
FIG. 3 is a perspective, schematic diagram of the tape applicator head of the machine shown in FIG. 1 together with some of the axes of motion of the head.

Carriage 26 provides support for a tape applicator head or the like 30. Head 30 is supported on a rigid guide plate 32 which is movably supported to carriage 26 for movement of tape head 30 in a plurality of axes. Vertical movement of head 30 is define as the Z axis of motion of machine 10. Rotational movement of head 30 is defines as the C axis of motion and angular movement of head 30 is defined as the A axis of motion (FIG. 3). Specification of coordinates of the X, Y, Z, C, and A axes defines a location of a tape dispensing point 40 associated with tape head 30. Tape head 30 preferably further provides tape cutters (not shown) and may be controlled with respect to other axes (not shown) such as tape reel position or cutter angle and linear traverse of the tape cutters (not shown). Tape head 32 may be that shown in U.S. Pat. No. 4,627,886, entitled "Composite Tape Laying Machine with Pivoting Presser Member", the disclosure of which is incorporated herein by reference.

Gantry 20 is propelled bidirectionally in the X axis by separate drive motors 42,44 fixedly mounted to the distal supported ends of gantry 20. Coupled to motor 42 is transmission 46 which includes the necessary gearing (not shown) and an extending driver gear or pinion 48. Extending pinion 48 meshes with rack 50 which is fixedly mounted to and adjacent side member 16. As is well understood, velocity command signals will be utilized to drive motor 42 thereby causing pinion 48 to rotate and, in cooperation with rack 50, one end of gantry 20 to move. Motor 44 is likewise coupled to transmission 52, the extending pinion 54 of which engages a rack 56 fixedly mounted to and adjacent side member 18, to similarly effectuate movement of the other end of gantry 20.

Figure 4:
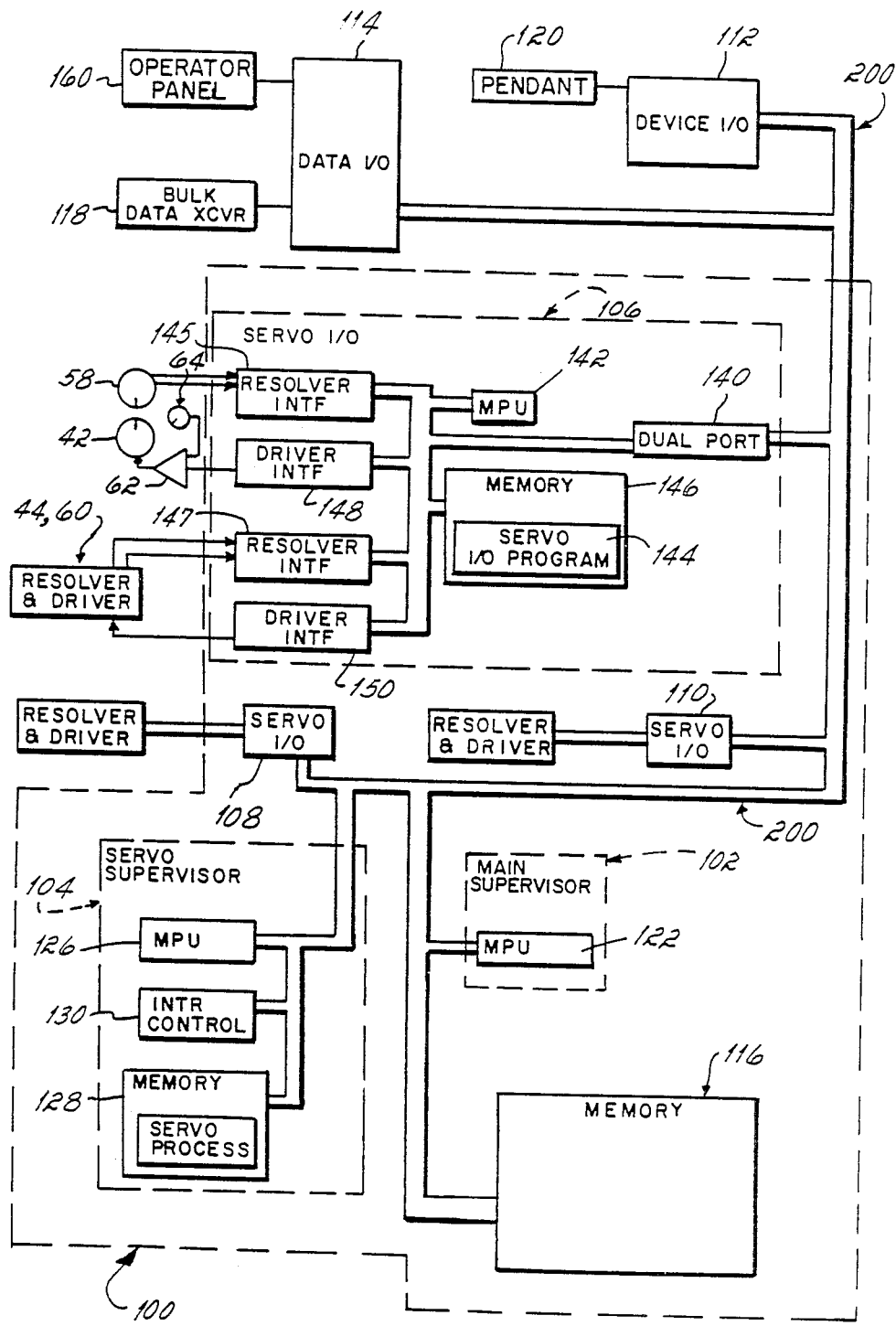
FIG. 4 is a block diagram of the control for the machine shown in FIGS. 1 and 2.

To provide positional information of gantry 20, motors 42,44 incorporate position transducers or resolvers 58,60 (see FIG. 4), respectively, whereby movement of gantry 20 is translated to feedback signals for utilization in control of motors 42,44 as will be described hereinafter. For present purposes, it is sufficient to understand that motors 42,44 are independently controlled by respective servo controls which are preferably responsive to a single X axis change in position command signal (although separate such command signals could be employed). Motor 42 and its associated gearing and servo control may be referred to as the X servo mechanism and motor 44 and its associated gearing and servo control may be referred to as the X' servo mechanism.

Coupled between each of motors 42,44 and its respective servo control is a drive amplifier 62 Preferably, each motor includes a tachometer 64 (see FIG. 4) the output of which is fed back to drive amplifier 62 for a velocity feedback loop as is conventional. Drive amplifier 62 further preferably includes a gain adjustment (not shown) to manually set the gain thereof so that a predetermined voltage signal from the related servo control will cause movement of the related member at a predetermined velocity as will be explained. Drive amplifier 62 further preferably includes a balance adjust (not shown) by which to manually set the bias on drive amplifier 62 so that a signal of zero volts from the related servo control will result in a velocity of zero of the related member.

With respect to the Y axis, motion of carriage 26 relative to gantry 20 is effected by drive motor 68 which, through transmission 70, imparts rotation to a pinion (not shown) which meshes with rack 72 rigidly affixed to gantry 20 to cause movement of carriage 26. The position of carriage 26 in the Y axis is measured by a position transducer or resolver (not shown) coupled to motor 68.

Motion of tape head 30 in the Z and C axes will now be explained. Motion of tape head 30 in the Z axis is accomplished by a nut (not shown) through which is threadably received a threaded rod (not shown). The nut is held to column 34 so that vertical motion of the nut translates to vertical motion of column 34 whereby plate 32 coupled thereto also moves vertically. The threaded rod is threadably received in the nut and is caused to rotate by drive motor 78 via a related transmission (not shown), both of which are affixed to the top of upper housing 36 which is itself coupled to carriage 26 for movement therewith. As the threaded rod rotates, the nut will ride up and down thereon causing head 30 (supported on plate 32 to move upwardly and downwardly in the Z axis. Coupled to motor 78 is also a position transducer or resolver (not shown) by which the position of head 30 in the Z axis may be monitored. In addition to drive motor 78, pneumatic counter balance 76 is provided to equalize the load presented to drive motor 78 between the up and down directions. Preferably the threaded rod and nut (both not shown) comprise a ball screw arrangement.

Rotation of head 30 in the C direction is effected by rotation plate 32 by a drive (not shown) which extends through lengthwise slot 38 in gantry 20 and within column 34. Such rotation is imparted by drive motor 74 through a transmission (not shown). Sensing of motion (or angle) is similarly accomplished with a resolver (not shown) coupled to motor 74. Finally, angulation of head 30 in the A direction is similarly effected by a drive motor (not shown) affixed to guide plate 32. The drive motor (not shown) is coupled to a pinion (also not shown) which meshes with arcuate rack 80 affixed to head 30. Plate 32 is provided with arcuate ways 82 which cooperate with slides (not shown) secured to head 30 to maintain angulation in a desired path. Positional (angular) information in the A axis may also be monitored by a resolver coupled to the drive motor (both not shown).

Machine 10 further preferably includes a tray 84 attached to support stands 12 and in which wheeled wire guide 86 rides. Wire guide 86 provides a convenient mechanism to avoid tangling the wires 88 coupled between the various motors and resolvers and the like of machine 10 and computer or control 100 which will now be illustrated with reference to the block diagram of FIG. 4.

Control 100 directs motion of the members of machine 10. Control 100 is a digital microprocessor-based computer system. Hence, in the preferred embodiment, the change in position signals, following error signals and gain factor signals, for example, are implemented as digital words. Control 100 includes a plurality of independent modules including main supervisor (or block processor) 102, servo supervisor 104, servo modules 106, 108, and 110 (servo I/O's) each of which may be coupled to one or more drivers and resolvers, device input/output module 112, and data input/output module 114 all connected by a common bus 200. Each of these modules typically includes a microprocessor and associated peripheral devices and memory as required for the function of the module. Applicant has chosen to implement these modules using the 80186 microprocessor and peripheral devices available from Intel Corporation. Control 100 also includes a main memory 116 in which is stored the application program(s) defining desired movement of the members to construct a component such as an aircraft wing, for example, on a layup or mold (not shown) positioned between pylons 12,14.

The overall cycle of operation of machine 10 is defined by an application program stored in memory 116 and executed by main supervisor 102. The application program stored within memory 116 may be produced on independent equipment and loaded through the data input/output module 114 from a bulk data transceiver 118. A pendant 120 is coupled to bus 200 by device I/O 112 by which to manually control movement of the members of machine 10.

During execution of the application program, microprocessor unit 122 of main supervisor 102 executes the selected programs stored in memory 116 until the end of the program has been reached, i.e., all the moves of the tape head have been completed. To effect movement of the machine members for each move of tape head 30, main supervisor 102 generates span and control signals (see FIG. 5A) which are utilized by servo supervisor 104 to repetitively generate change in position command signals by which to control operation of the servo control modules 106,108, and 110 as will be explained. Servo supervisor 104 includes a local microprocessor 126 executing servo processing programs (see FIG. 5B) stored within local memory 128 and an interrupt control 130 responsive to interrupts from a master servo I/O (one of the servo I/O's, e.g., servo I/O 106 is selected as the master servo I/O). In response to an interrupt from servo I/O 106, preferably every 5 milliseconds, change in position command signals are determined by servo supervisor 104 and distributed to the appropriate servo mechanism input/output interface. Each of the servo mechanism input/output interface modules provides the necessary interface circuitry for connection to at least one drive motor and its associated resolver.

Further details of the servo mechanism interface modules are illustrated by the servo control module 106 which controls four (4) axes including the X and X' axes and is, hence shown coupled to two drivers and resolvers. Although not shown, module 160 also controls motion of head 30 in the Y and Z axes. Each of servo I/O's 108 and 110 may similarly be coupled to four drivers and resolvers (only one shown for each in FIG. 4) to thus control motion of head 30 in several other axes, including the A and C axes.

Connection between module 106 and common bus 200 is achieved through dual port memory device 140. Data to be exchanged between module 106 and other modules within the system is transferred asynchronously through dual port memory device 140. Local processor 142 executes servo input/output programs 144 (see FIG. 6) stored within local memory 146.

Local processor 142 receives position feedback signals from position transducers 58 (X axis) and 60 (X' axis) through resolver interface circuitry 145 and 147, respectively. Position feedback signals from transducer 58, for example, are compared to change in position command signals (#CMD which is either a 1st CMD or 2nd CMD iteration change in position command) received from servo supervisor 104 to generate a following error signal (FE). Processor 142 modifies the following error signal by a gain factor signal stored in memory 146 (and as adjusted in accordance with the present invention) to produce velocity command signals (VCMD) which are converted to voltage signals in driver interfaces 148,150. Interfaces 148,150 include respective digital-to-analog converters (not shown) which convert the digital velocity command signals to voltage signals which are input to amplifiers (e.g., amplifier 62) to drive motors 42,44. Thus, the velocity command signals (VCMD) define the velocity of the driver motors (42 and 44) and are produced from a comparison of the positional information provided by resolvers 58 and 60 and the change in position signals (#CMD) as modified by a gain factor signal associated with each servo mechanism.

In the preferred embodiment, memory 146 is preferably preprogrammed with four gain factor signals. That is, the initial or pre-programmed gain factor signals for each motor 42,44 are separately selected for both forward and reverse directions of movement of gantry 20 to accommodate differences in transmissions 46,52; pinions 48,54; and racks 50,56, for example, so that the distal ends of gantry 20 move at the same predetermined velocity in response to a known change in position command to the respective servo controls for motors 42,44. The gain factors for the other axes are similarly preselected or initialized to account for gearing relationships and the like so that the velocity of movement in those axes may be known. In cooperation with the manual gain adjustment for drive amplifier 62, the initial gain factor signals are preferably selected as 1.0000, so that the velocity of each end of gantry 20 is 1 inch/min. per 1/1000 inch FE in each of the forward and reverse directions. Once set, the manual adjustment is typically not altered. Hence, drift may occur which can lead to skew, for example. Also, the initial 1.0000 gain factor signal in each direction may not result in the expected velocity in both the forward and the reverse directions. The gain factor signal adjustment of the present invention, therefore, is provided to compensate for drift in the drive amplifiers and to correct errors in the preselected gain factor signal.

Figure 5A:
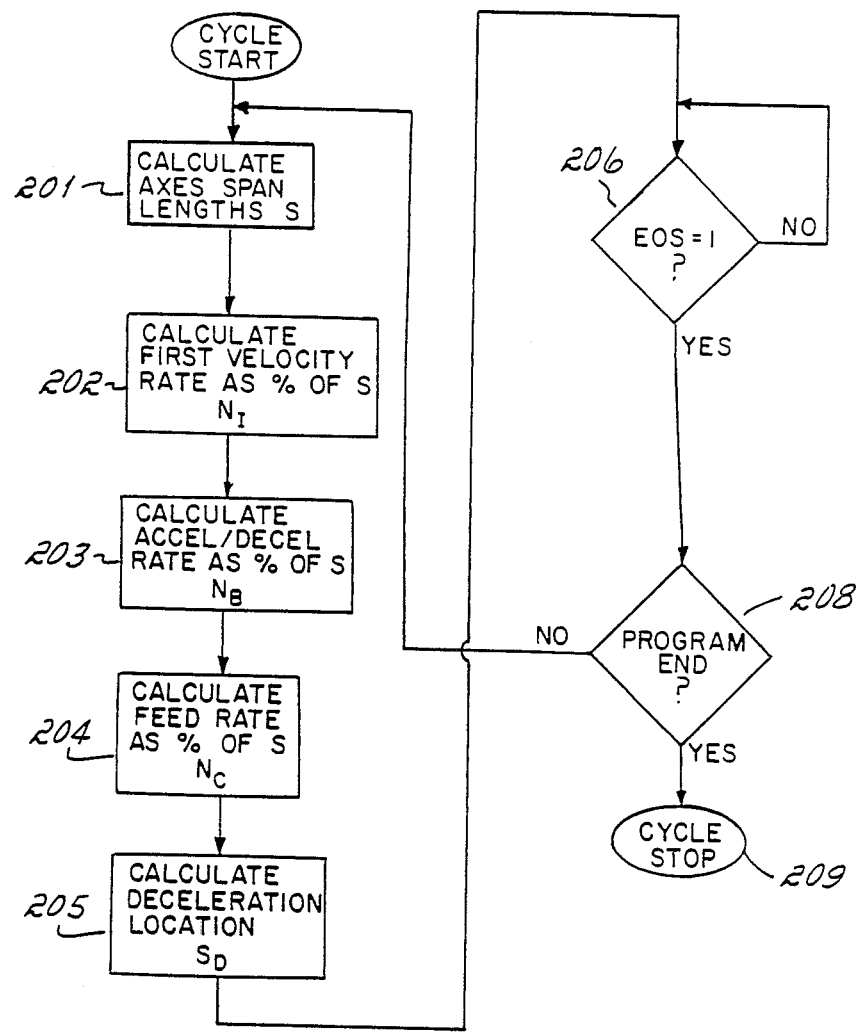
FIGS. 5A and 5B are simplified flow charts of the control procedures effected by the control of FIG. 4.
Figure 5B:
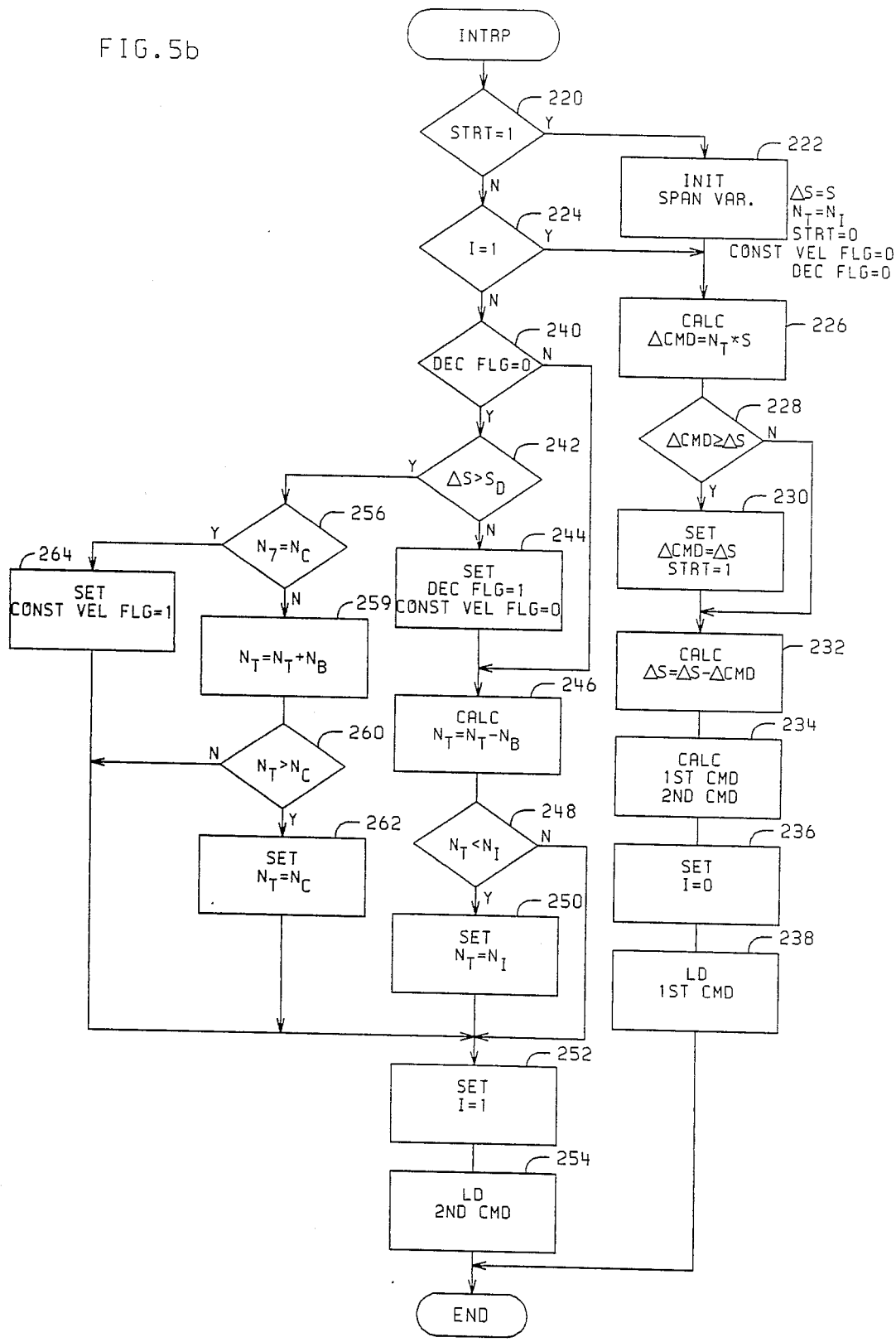

The control procedures for effecting motion of the members during operation of the application program stored in memory 116 shall be described with reference to the flow charts. The flow chart of FIG. 5A illustrates the processing steps executed by the main supervisor 102 to produce span and control signals in accordance with the application program defining locations and functions stored in memory 116. The flow chart of FIG. 5B illustrates the processing steps executed by servo supervisor 104 to generate change in position command signals from the span and control signals produced by main supervisor 102.

Processing of the procedural steps of the flow chart of FIG. 5A is initiated by a cycle start signal produced in response to the operation of a cycle start push button (not shown) on operator panel 160. At process step 201 data are computed which are required for the interpolation of intermediate points along a linear path, for example, between two successive programmed locations of tape application point 40. The span length S in each axis is determined from the coordinate data of these locations. A pre-programmed velocity or feed rate is recalled from memory 116 and, in conjunction with the span length signal S for each axis, additional velocity control signals are calculated at process steps 202-205 as follows:

$N_I$ = the percent of S which the member is to move in the selected axis during the first and last interpolation intervals defining a step velocity change;

$N_B$ = the percent of S by which the interpolation incremental distance is to change;

$N_C$ = the percent of S which the member is to move during each interpolation interval in the constant velocity mode; and $S_D$ = the distance from the end of the span at which deceleration must begin from the programmed velocity.

These values for S, $N_I$, $N_B$, $N_C$ and $S_D$ are stored in a buffer in memory 116 for access by the servo supervisor 104 during the servo supervisor's execution of the span.

After process steps 201–205 have been executed, the overall cycle of operation executed by the main supervisor is controlled by the completion of motion as indicated by the end of span signal detected at decision step 206. If the servo supervisor has not set the end of span flag, herein referred to as EOS, the sequence may idle at process step 206 until the end of the span is reached (EOS=1). Preferably, the sequence of steps 201 to 205 will be executed for the next span before the end of the previous span is reached in an effort to pre-process information to generate the next set of span and control signals which may then be loaded into a buffer.

Following completion of interpolation, a decision is made at process step 208 to determine whether or not the location defining the end of the current span corresponds to the end of the program stored in memory 116. If not, execution of the control procedure of FIG. 5A continues to process step 201 to initialize data for the next programmed span. Execution of the stored program of motion continues in this fashion until it is determined at decision step 208 that the last location of the program has been reached. Thereafter, the tape laying program execution ceases, but the entire program may be re-executed by operator intervention.

The primary axis command signal processing of servo supervisor 104 shall be described with reference to FIG. 5B. Periodically, in response to an interrupt signal generated by master servo I/O 106, a span increment procedure is executed to output servo commands to the servo I/O modules 106, 108, 110.

At decision step 220 it is determined whether the current execution of the span increment interpolation procedure is the first execution for the current span. If it is, span variables are initialized at process step 222 in preparation for interpolation of the first increment of the current span. The span length remaining ΔS is initialized to the axis span length S; the current value of the increment factor $N_T$ is initialized to the step velocity factor $N_I$; the first execution flag STRT is initialized to 0; the constant velocity flag is initialized to 0 and the deceleration flag is initialized to 0. If the current execution of the span increment interpolation procedure is not the first for the span, process step 222 is skipped. At decision step 224 it is determined whether the iteration toggle I is set to 1 indicating a first iteration for an interpolated change in commanded position ΔCMD. Each change in commanded position ΔCMD is processed in two iterations, and each iteration outputs half of the total change in commanded position to the appropriate servo I/O. The interpolation procedure maintains a record of progress in the current span as the magnitude of the span length remaining ΔS. This magnitude is reduced once for each pair of iterations.

At process step 226, the magnitude of the change of commanded position (ΔCMD) for the next pair of iterations is calculated as the product of the axis span length S and current value of the increment factor $N_T$. During the first iteration of the first execution of the procedure, the increment factor $N_T$ has a value equal to the step velocity factor $N_I$ calculated by the pre-interpolation procedure at process step 202. The magnitude of the change in commanded position ΔCMD is compared to the current magnitude of the remaining span length ΔS at decision step 228. If the change in commanded position ΔCMD is greater than or equal to the remaining span length ΔS, the change in commanded position ΔCMD is set equal to the remaining span length ΔS at process step 230. Since this condition corresponds to interpolation of the last span increment of the current span, the first flag is set true and the end of span flag EOS is set true (=1). Process step 230 is skipped if the change in commanded position ΔCMD is less than the remaining span length ΔS.

At process step 232, a new value for the remaining span length ΔS is calculated by subtracting the magnitude of the change in commanded position ΔCMD from the previous value of the remaining span length ΔS. At process step 234, the first and second iteration change in position commands 1st CMD and 2nd CMD are calculated. These commands are referred to here as #CMD (wherein # refers to 1st or 2nd as appropriate). 1st CMD is calculated by dividing ΔCMD by 2, and 2nd CMD is equal to the difference of ΔCMD and 1st CMD. This calculation self corrects for round off errors in the division of ΔCMD. At process step 236, the iteration toggle is set to 0 in preparation for the next iteration. At process step 238, the first iteration change in position command 1st CMD is loaded into the appropriate servo I/O module.

The second iteration change in position command 2nd CMD generation begins with determination of a 0 value of I detected at decision step 224. On the occurrence of the next interrupt, after the first iteration, the value of the iteration toggle flag I will be 0 and the execution of the interpolation procedure will continue at decision step 240. There, it is determined whether the deceleration flag has been set true, indicating that interpolation has progressed to the deceleration point $S_D$ or beyond. If not, execution continues at decision step 242 where it is determined whether the remaining span length ΔS is more than the deceleration distance $S_D$ calculated in the preinterpolation procedure at process step 205. If the remaining span length ΔS is not more than the deceleration distance $S_D$, execution continues at process step 244 where the deceleration flag is set true and the constant velocity flag is set false. Thereafter, a new value for the increment factor $N_T$ is calculated at process step 246 to decrease the magnitude of the increment factor $N_T$ by the acceleration/deceleration incremental adjustment $N_B$. At decision step 248 it is determined whether the new value of the increment factor $N_T$ is less than the step velocity factor $N_I$. If it is, the interpolation factor $N_T$ is set equal to the step velocity factor $N_I$ at process step 250. Otherwise, process step 250 is skipped. Thereafter, at process step 252, the iteration toggle flag I is set equal to 1 in preparation for the next iteration. At process step 254, the second iteration change in position command 2nd CMD is loaded into the appropriate servo I/O module. It will be appreciated that the new value of the increment factor $N_T$ will result in the interpolation of a smaller increment command ΔCMD with the next execution of the increment interpolation procedure, thus effecting a decrease of the velocity of the affected machine member.

If interpolation had not progressed to the deceleration point, execution from decision step 242 would proceed to decision step 256 where it is determined whether the current value of the increment factor $N_T$ is equal to the constant velocity factor $N_C$ calculated during execution of the pre-interpolation procedure at process step 204. If the result of this test is negative, it is known that interpolation is in the acceleration phase. Execution continues at process step 258 where the magnitude of the increment factor $N_T$ is increased by the acceleration/deceleration factor $N_B$. At decision step 260, the new value of the increment factor $N_T$ is compared to the constant velocity factor $N_C$ calculated during execution of the pre-interpolation procedure at process step 204. If the increment factor $N_T$ is greater than the constant velocity factor $N_C$, it is set equal to the constant velocity factor $N_C$ at process step 262. Otherwise, process step 262 is skipped.

If at decision step 256 the interpolation factor $N_T$ is equal to the constant velocity factor $N_C$, no modification is required until interpolation progresses to the deceleration point $S_D$ and interpolation continues at constant velocity. Execution from decision step 256 proceeds to process step 264 where the constant velocity flag is set and therefrom to process step 252.

While the foregoing has been described with respect to change in position signals as if for only one axis, the sequence occurs concurrently for each axis. Hence, the various servo I/O's will receive respective interpolation change in position signals or commands (#CMD) for the appropriate axes almost simultaneously whereupon movement in all axes will be coordinated. That is, movement in each axis will accelerate to a constant velocity so that the respective constant velocity or feed rate is attained for each axis at the same time. Deceleration is to likewise occur simultaneously. Main supervisor 102 thus calculates the various values of span and control signals S, $N_I$, $N_B$, $N_C$, and $S_D$ for each axis accordingly.

Additionally, the span length S (or, alternatively, angle of rotation in the A axis, for example) may be positive or negative indicating forward or reverse motion of the member in its respective axis. As a consequence, the iteration change in position signals (#CMD) will also be either positive or negative to indicate the direction of movement.

Figure 6:
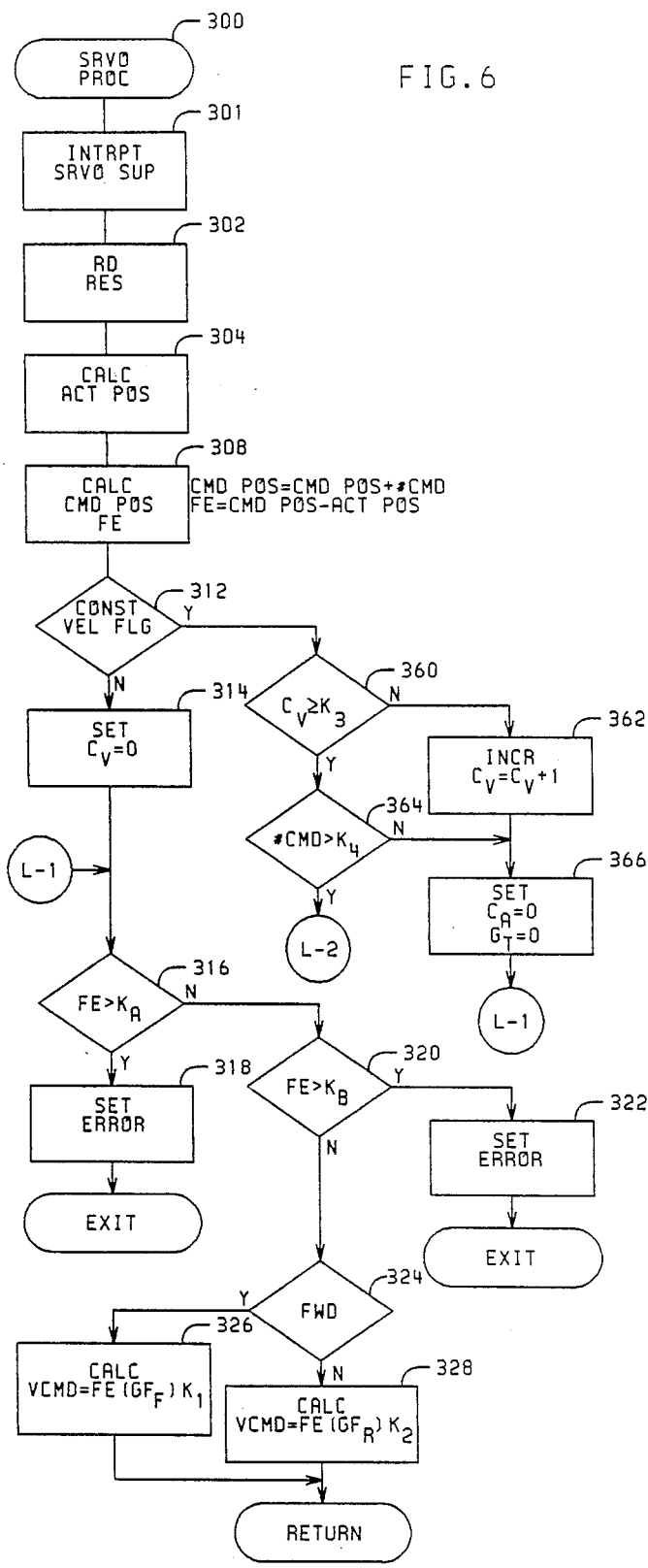
FIG. 6 is a flow chart of the procedure for controlling a motor according to dynamic gain factor adjustment of the present invention.
Figure 6:
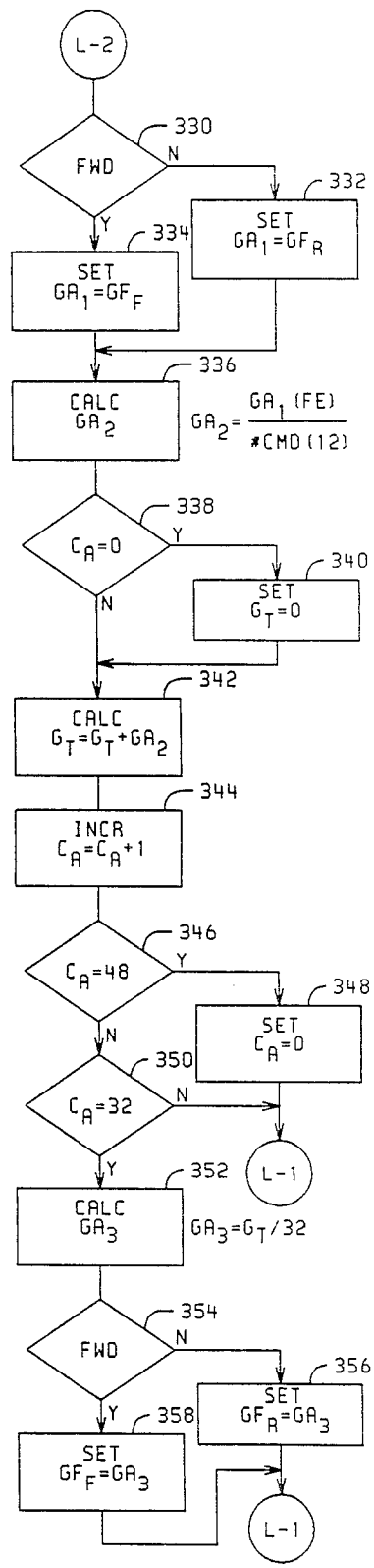

The procedure by which a motor is driven and the gain factor adjustment procedure of the present invention shall be described with reference to the flow chart of FIG. 6. FIG. 6 will be explained with respect to servo I/O 106 as it relates to movement of the X axis of gantry 20 by motor 42. It should be understood, however, that the flowchart is representative of the sequence which may be utilized in connection with other motors or drivers such as driver 44. Additionally, as mentioned, machine 10 is preferably programmed so that motion is along each axis of motion concurrently whereby motion in each axis reaches a constant velocity at the same time, although not necessarily the same velocity. Thus, portions of the sequence shown in the flowchart of FIG. 6 may operate as a subroutine common to control of each driver and resolver serviced by at least that servo I/O. The sequence of FIG. 6 is initiated every 5 milliseconds (step 300) and begins with issuance of an interrupt (step 301) to the servo supervisor 104.

At process steps 302 and 304, resolver data from resolver 58 is read by resolver interface 145 and microprocessor unit 142 calculates the actual position (ACT POS) of the member driven by driver 42. At process step 308 a command position (CMD POS) is calculated by summing the iteration change in position command (#CMD) with the current value of command position CMD POS. Also at process step 308 a following error signal (FE) is calculated as the difference between the calculated command position (CMD POS) and the actual position (ACT POS).

At decision step 312, it is determined whether servo supervisor 104 is indicating that the constant velocity indicator is not set. If this indicator is not set, the program branches to process step 314 in anticipation of generation of a velocity command signal, VCMD, which signal is converted to a voltage signal and via amplifier 62 a current to energize motor 42 to drive one end of gantry 20.

At process step 314, a counter containing a count $C_v$ is reset to zero. The count $C_v$ is utilized to determine whether gantry 20 is likely moving at a predetermined velocity as will be explained hereafter. At decision step 316, it is determined whether the following error is greater than a predetermined amount $K_A$. If FE is too large, then the member has not moved sufficiently to keep up with the commands from the servo supervisor 104. As a result, an error signal representing servo failure is set at process step 318 which is made available to the main supervisor 102 and the sequence of FIG. 6 terminates. Thereafter, power to machine 10 is disconnected (not shown). On the other hand, if the following error is within limit $K_A$, it is determined whether following error is within a second limit at decision step 320. If the following error is greater than second limit $K_B$, this indicates an excessive following error which is represented by an excess error signal set at process step 322 and made available to main supervisor 102. And, again, the sequence of FIG. 6 is terminated. Also, the motion of the member is stopped (not shown). If the following error is also within the second limit, decision step 324 is conducted.

At decision step 324, it is determined whether the #CMD signal is positive or negative to indicate that movement should be in either the forward or the reverse direction, for example. If motion is to be in a forward direction, the velocity command signal (VCMD) is determined at process step 326. In the forward direction, the velocity command signal is equal to the product of the following error (FE), the forward gain factor ($GF_F$), and an output unit conversion constant $K_1$. If, on the other hand, the result of decision step 324 is that #CMD indicates movement is to be in the reverse direction, generation of the velocity command signal will proceed at process step 328. Here, VCMD is the product of FE, the reverse gain factor ($GF_R$) and an output unit conversion constant $K_2$. The VCMD signal is then converted to a voltage signal and coupled to motor 42 through drive amplifier 62 to drive one end of gantry 20. The output unit conversion constants $K_1$ and $K_2$ may as well be incorporated directly into the circuitry of the digital to analog converter (not shown) which converts the digital VCMD signal to a voltage signal which is then applied to drive the motor.

The forward and reverse gain factors $GF_F$ and $GF_R$, respectively, are susceptible of modification at constant velocity in accordance with the present invention to produce actual following error magnitudes consistent with the predicted following error at an effective desired gain. The gain factor modification is operative only during constant velocity motion. Therefore, when the constant velocity flag is set, as determined at decision step 312, the gain factor modification procedure may be executed.

At decision step 360 it is determined whether the current value of the counter $C_V$ has reached a predetermined limit $K_3$ indicating that the constant velocity command condition has existed for a sufficient period to have effected constant velocity of the motors. If the counter $C_V$ is less than the limit $K_3$, it is incremented at process step 362 and the gain modification procedure is bypassed through process step 366 where variables used in the procedure are initialized to zero. Thereafter execution continues through on-page connector L-1 to decision step 316 as before described.

Once the value of counter $C_v$ is equal to or greater than the predetermined limit $K_3$, the gain modification procedure may be executed. At decision step 364 the magnitude of the iteration command position #CMD is compared to a predetermined limit $K_4$ defining a minimum velocity below which gain modification is not attempted. In the event the command velocity is less than the limit, the gain modification procedure is bypassed through process step 366 and on-page connector L-1.

Assuming the commanded velocity exceeds the minimum velocity, execution continues through on-page connector L-2 to decision step 330. There it is determined whether or not the direction commanded is forward (FWD). If the commanded direction is forward, at process step 334 the forward gain factor $GF_F$ is loaded into a register $GA_1$ used in the gain modification procedure. If the commanded direction is not forward, at process step 332 the reverse gain factor $GF_R$ is loaded into the register $GA_1$. Thereafter, at process step 336, a desired gain factor is calculated and the result held in a second register $GA_2$. The desired gain factor is computed by dividing the actual velocity command by the desired following error. For this computation the actual velocity command is determined by multiplying the current gain factor by the actual following error. The desired following error is determined by multiplying the change in commanded position #CMD by a constant (12) relating change in commanded position to following error. The resulting quotient represents a gain factor which will produce the desired following error.

To optimize the axis performance, the desired gain factor calculation is repeated for multiple executions of the procedure and an average value of the desired gain factor is then applied. Further modification is subsequently inhibited until after sufficient time for the servo mechanism to respond to the adjusted gain. The averaging of desired gain factor values begins at decision step 338 where an accumulation counter $C_A$ is tested for zero. If the desired gain factor accumulation counter $C_A$ is zero, the accumulated gain factor $G_T$ is set to zero at process step 340. At process step 342 a new value of the accumulated gain factor $G_T$ is calculated by adding the desired gain factor from the second register $GA_2$. At process step 344 the accumulation counter $C_A$ is incremented. At decision step 346 the accumulation counter $C_A$ is tested for equality with 48. When the accumulation counter $C_A$ has been incremented to 48, representing 48 repetitions of the calculation of a desired gain factor and the accumulation thereof, it is reset to zero at process step 348. Thereafter the remainder of the gain modification procedure is skipped through the on-page connector L-1. If it is determined at decision step 346 that the accumulation counter is not equal to 48 it is tested for equality with 32 at decision step 350. If 32 values of the desired gain factor have been accumulated, as represented by equality at decision step 350, the average desired gain factor is computed at process step 352 and the result stored in a third register $GA_3$. Unless the accumulation counter $C_A$ is equal to 32, the remainder of the gain modification procedure is skipped via the on-page connector L-1. The combination of decision step 346 and decision step 350 result in the creation of an average value for 32 calculations of the desired gain modification and insures that the application of the average value will occur only every 48 iterations of the servo processing procedure.

The application of the average desired gain factor is effected by the procedure beginning at decision step 354 which determines the commanded direction. If the commanded direction is forward, the forward gain factor is set to the average desired gain factor at process step 358. If the commanded direction is reverse, the reverse gain factor is set to the average desired gain factor at process step 356. The revised gain factor is used in the following production of a velocity command signal by return to processing at decision step 316 through the on-page connector L-1.

In operation whereby gantry 20 is to be moved along the X axis, the same #CMD signal is utilized to control both driver 42 and driver 44. Hence, servo I/O 106 may duplicate many of the steps of FIG. 6 for the X and X' axes while other steps may be common to control of both axes. The forward and/or reverse modification gain factor adjustments are preferably implemented independently for both of the X and X' axes as necessary. In this manner, each end of gantry 20 is caused to be driven at the velocity instructed by the servo supervisor 104 and drift in the drive amplifiers or digital-to-analog converters, for example, will be dynamically and independently compensated by virtue of the present invention. Also, if an initial gain factor ($GF_F$ or $GF_R$) is slightly incorrect, it will be corrected by the gain factor adjustment of the present invention. When the foregoing is applied to all axes simultaneously, it can be seen that the path of tape application point 40 will be accurately maintained.

While the present invention has been illustrated by description of a preferred embodiment and while the preferred embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A method of servocontrol of motion wherein velocity of a motor is controlled in response to a velocity command signal derived from a change in position signal commanding a change in position and in actual position signal representing a measured position, the method comprising the steps of:
    (a) producing an actual following error signal representing a difference between the measured position and the commanded change in position;
    (b) producing a desired following error signal in response to the commanded change in position, the desired following error signal representing a following error expected for a desired servomechanism gain at a rate of change in position determined by the command change in position; the (c) producing a gain signal in response to a ratio of actual following error signal to the desired following error signal; and (d) producing the velocity command signal in a respone to the actual following error signal and the gain signal.

2. The method of claim 1, wherein the step of producing the gain signal further comprises the steps of:

(a) producing a constant velocity signal to indicate that the commanded rate of change of position is constant;

(b) recalling a current value of the gain signal associated with motion at constant velocity;

(c) calculating a value of gain as a product of the current value of the gain signal and the ratio of the actual following error signal to the desired following error signal;

(d) replacing the current value of the gain signal with the calculated value; and (e) periodically repeating steps (b) through (d) so long as the constant velocity signal indicates constant velocity is commanded.

3. A method of servocontrol of motion of a rigid propelled by drive means at distal ends thereof, the drive means including motors responding to velocity command signals derived from a change of position signal commanding a change in position of the member and actual position signals representing measured positions of the drive means, the method comprising the steps of:

(a) producing an actual following error signal for each drive means, each actual following error signal representing a difference between the measured position and the commanded change in position;

(b) producing a desired following error signal for each drive means in response to the commanded change in position, the desired following error signal representing a following error expected for a desired servomechanism gain at a rate of change of position determined by the commanded change in position;

(c) producing a gain signal for each drive means in response to a ratio of the actual following error signal to the desired following error signal for the associated drive means; and (d) producing the velocity command signal for each drive means in response to the actual following error signal and the gain signal for the associated drive means.

4. The method of claim 3 wherein the step of producing the gain signal for each drive means further comprises:

(a) producing a constant velocity signal to indicate that the commanded rate of change position is constant;

(b) recalling a current value of the gain signal associated with motion at constant velocity;

(c) calculating a value of gain as a product of the current value of the gain signal and the ratio of the actual following error signal to the desired following error signal;

(d) replacing the current value of the gain signal with a calculated value; and (e) periodically repeating steps (b) through (d) so long as the constant velocity signal indicates constant velocity is commanded.

5. An apparatus for servocontrol of motion wherein velocity of a motor is controlled in response to a velocity command signal derived from a change in position signal commanding a change in position and an actual position signal representing a measured position, the apparatus comprising:

(a) means for producing an actual following error signal representing a difference between the measured position and the commanded change in position;

(b) means for producing a desired following error signal in response to the commanded change in position, the desired following error signal representing a following error expected for a desired servomechanism gain at a rate of change of position determined by the commanded change in position;

(c) means for producing a gain signal in response to a ratio of the actual following error signal to the desired following error signal; and (d) means for producing the velocity command signal in response to the actual following error signal and the gain signal.

6. The apparatus of claim 5 wherein the means for producing a gain signal further comprises:

(a) means for producing a constant velocity signal to indicate that the commanded rate of change of position is constant;

(b) means responsive to the constant velocity signal for periodically:

(i) recalling a current value of the gain signal associated with motion at constant velocity;

(ii) calculating a value of gain as a product of the current value of the gain signal and the ratio of the actual following error signal to the desired following error signal; and (iii) replacing the current value of the gain signal with the calculated value.

7. An apparatus for servocontrol of motion of a rigid member propelled by drive means at distal ends thereof, the drive means including motors responding to velocity command signals derived from a change in position signal commanding a change in position of the member and actual position signals representing measured positions of the drive means, the apparatus comprising:

(a) means for producing an actual following error signal for each drive means, each actual following error signal representing a difference between the measured position of the drive means and the commanded change in positions;

(b) means for producing a desired following error signal for each drive means in response to the commanded change in position, the desired following error signal representing a following error expected for a desired servomechanism gain at a rate of change of position determined by the commanded change in position;

(c) means for producing a gain signal for each drive means in response to a ratio of the actual following error signal to the desired following error signal; and (d) means for producing the velocity command signal for each drive means in response to the actual following error signal and the gain signal of the associated drive means.

8. The apparatus of claim 7 wherein the means for producing a gain signal further comprises:

(a) means for producing a constant velocity signal indicate that the commanded rate of change of position is constant;

(b) means responsive to the constant velocity signal for periodically:
  (i) recalling a current value of the gain signal associated with motion at constant velocity of the driving means;
  (ii) calculating a value of gain as a product of the current value of the gain signal and the ratio of the actual following error signal to the desired following error signal; and
  (iii) replacing the current value of the gain signal with the calculated value.

* * * * *